United States Patent [19]

Karam et al.

[11] Patent Number: 5,438,593

[45] Date of Patent: Aug. 1, 1995

[54] ADAPTIVE THRESHOLD DECISION DEVICE FOR MULTISTATE MODULATION

[75] Inventors: Georges Karam; Jean-Louis Jacquart, both of Paris, France

[73] Assignee: SAT (Societe' Anonyme de Tele'communications, France

[21] Appl. No.: 234,832

[22] Filed: Apr. 28, 1994

[30] Foreign Application Priority Data

Apr. 18, 1994 [FR] France ............... 94 04606

[51] Int. Cl.[6] ............ H04L 25/06; H04L 25/10
[52] U.S. Cl. .................... 375/317; 327/75
[58] Field of Search ............... 375/76, 17; 341/54, 341/56; 327/73, 74, 75

[56] References Cited

U.S. PATENT DOCUMENTS

| | | | |
|---|---|---|---|
| 4,602,374 | 7/1986 | Nakanura et al. | 375/76 |
| 5,025,456 | 6/1991 | Ota et al. | 375/76 |
| 5,119,404 | 6/1992 | Aihara | 375/76 |

Primary Examiner—Stephen Chin
Assistant Examiner—Huong Lvu
Attorney, Agent, or Firm—Laubscher & Laubscher

[57] ABSTRACT

An adaptive threshold decision device for multistate modulation produces, at a symbol frequency, symbols dependent on the levels of a received demodulated baseband signal. It comprises a voltage divider, an adder for adding the baseband signal to a midpoint voltage which is substantially the mean of lower and upper voltages applied to the terminals of the voltage divider to produce a transposed signal, plural comparators for comparing the transposed signal with plural voltages at terminals of the voltage divider thereby producing comparison result signals, an encoder for deriving control words according to the comparison result signals, and control circuits for respectively and independently controlling at least the lower and upper voltages according to the control words.

10 Claims, 4 Drawing Sheets

ADAPTIVE THRESHOLD DECISION DEVICE FOR MULTISTATE MODULATION

BACKGROUND OF THE INVENTION

1. Field of the Invention

The present invention is generally concerned with decisions to be arrived at in a receive subsystem of a multistate modulation-demodulation system. The present invention is more particularly concerned with a decision device for a non-linear modulation-demodulation system, typically a frequency modulation-demodulation system.

2. Description of the Prior Art

In a receive subsystem a decision device is connected on the output side of a demodulator device. The decision device determines successive symbols received at respective successive sampling times by comparing the level of the demodulated signal with predetermined thresholds.

Figure 1:
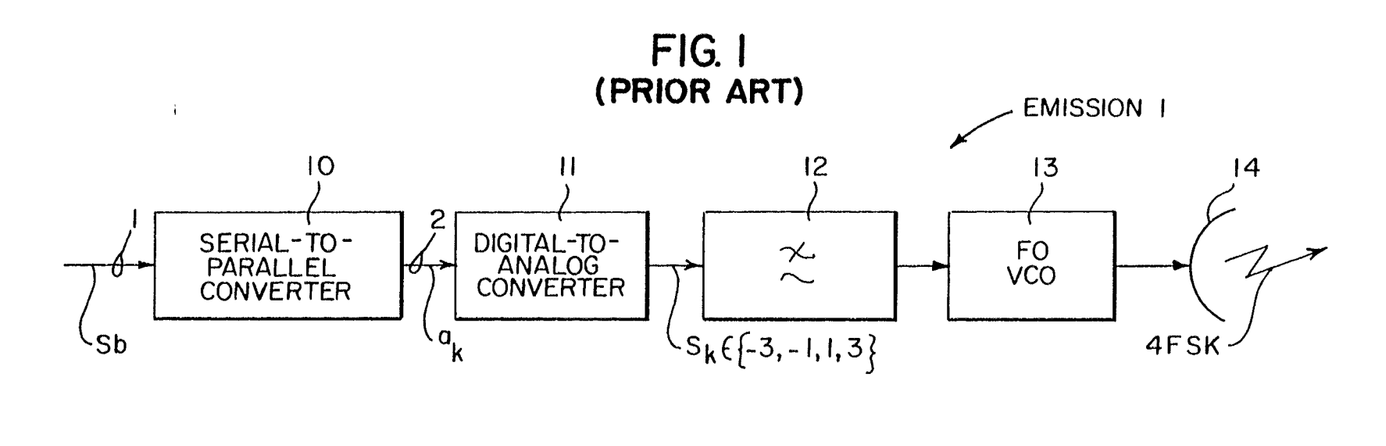
FIGS. 1 and 2 are respectively block diagrams showing a transmit subsystem and a receive subsystem forming a four-state non-linear modulation-demodulation system.
Figure 2:
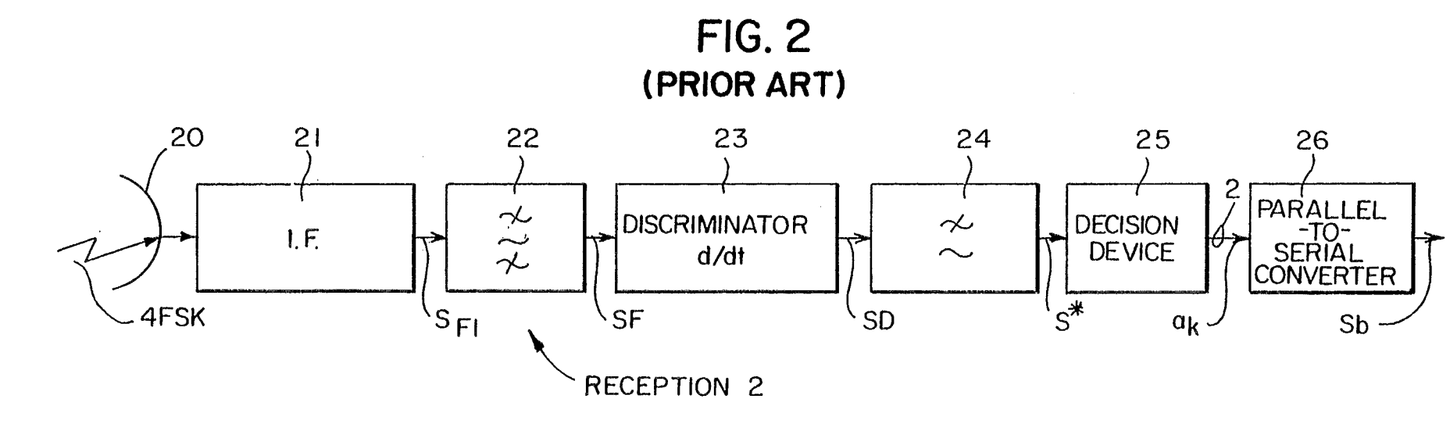

FIGS. 1 and 2 respectively show a transmit subsystem 1 and a receive subsystem 2 together forming a frequency modulation-demodulation system with four states known as the 4FSK or four-frequency shift keying system.

Referring to FIG. 1, the transmit subsystem 1 comprises a serial-to-parallel converter 10, a digital-to-analog converter 11, a low-pass filter 12 and a voltage-controlled oscillator 13. If the link between the subsystems 1 and 2 is of a radio type, an output of the transmit subsystem 1 and an input of the receive subsystem 2 are connected to respective antennas 14 and 20. The receive subsystem 2 comprises, connected to the antenna 20, a frequency converter stage 21 in which the signal frequency is converted to an intermediate frequency (I.F.), a band-pass filter 22, a frequency discriminator 23, a low-pass filter 24, a decision device 25 and a parallel-to-serial converter 26.

A baseband serial binary signal Sb to be transmitted is converted in the converter 10 into a signal made up of symbol words $a_k$ on two parallel binary elements. Each word $a_k$ is associated with two binary elements of the serial signal Sb and is part of a symbol word alphabet {00, 01, 10, 11}. Each word $a_k$ is converted in the digital-to-analog converter 11 into a symbol $S_k$ having one of four levels $-3$, $-1$, 1 or 3 according to the respective symbol word 00, 10, 01 or 11. The signal formed by the successive symbols $S_k$ is applied to an input of the oscillator 13 through the filter 12 which smooths the spectrum of the signal made up of the successive symbols. The oscillator 13 produces a 4FSK modulated signal with four states assuming a respective one of four frequencies $FO-3Fd$, $FO-Fd$, $FO+Fd$, $FO+3Fd$, according to the respective level $-3$, $-1$, 1 or $+3$ of the symbol $S_k$. FO and Fd are respectively the nominal frequency of the oscillator 13 and a predetermined frequency difference.

The 4FSK modulated signal is transmitted by the transmit antenna 14, then received by the receive antenna 20. It is fed from the antenna 20 to the frequency converter stage 21 which converts the spectrum of the received 4FSK modulated signal into an intermediate frequency signal $S_{FI}$. The signal $S_{FI}$ is filtered by the band-pass filter 22 in a narrow frequency band which is centered on an intermediate center frequency corresponding to the frequency FO converted. The filtered signal SF at the output of the filter 22 is fed to an input of the discriminator 23. By carrying out time differentiations the discriminator 23 discriminates between the frequencies in the filtered signal SF and delivers a signal SD whose levels are substantially equal to $-3$, $-1$, 1, 3 according to the symbols $S_k$ transmitted. This signal SD is low-pass filtered in the filter 24 to produce a baseband signal S*. In the decision device 25 the signal S* is sampled at the frequency of the transmitted symbols $S_k$. The levels assumed by the signal S* at the sampling times are compared to thresholds in the device 25 which delivers the symbol words $a_k$ according to the result of these comparisons. By applying parallel-to-serial conversion to the symbol words $a_k$ the converter 26 delivers the original binary signal Sb transmitted.

Figure 3:
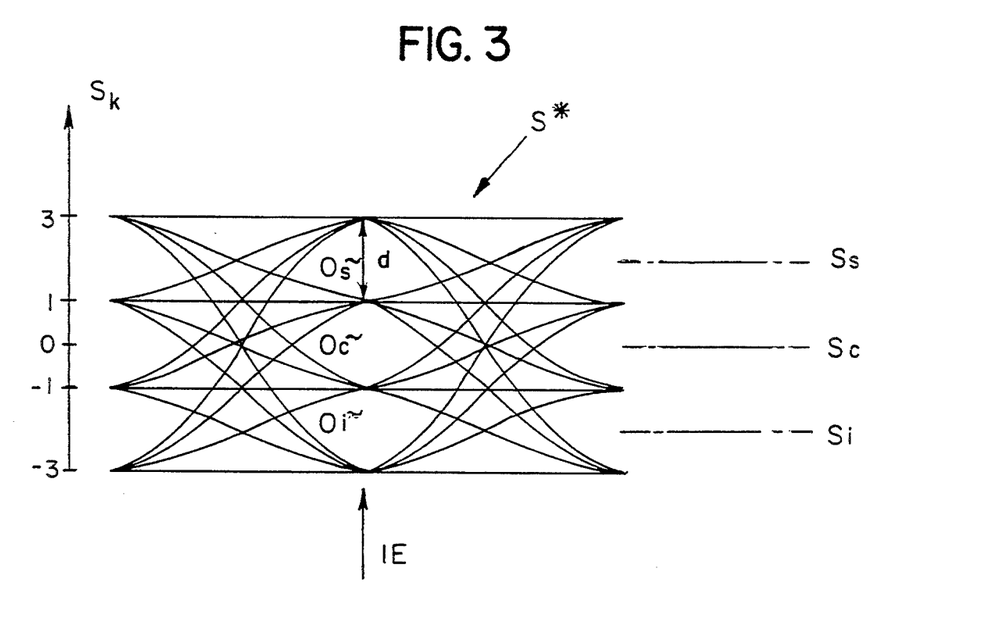
FIG. 3 is a theoretical eye diagram for a baseband signal resulting from demodulation of a four-state frequency modulated signal.

FIG. 3 is a diagram showing the theoretical eye diagram of a baseband signal S* resulting from four-state frequency modulation and demodulation, as delivered by the low-pass filter 24 in the receive subsystem 2. In this theoretical diagram, the vertical aperture d of each of the upper eye Os, the center eye Oc and the lower eye Oi is maximal and equal to the difference between the respective levels of two adjacent symbols, i.e., $d=(3-1)=1-(-1)=-1-(-3)=2$. A theoretical diagram like this represents null intersymbol interference at the sampling times. In the decision device 25 the baseband signal S* delivered by the filter 24 is sampled at meaningful sampling times IE and the levels of the resulting samples are compared to three thresholds Ss, Sc and Si shown on the righthand side in FIG. 3. There are four distinct outcomes for each sample. If the level of the sample is above the upper threshold Ss, the decision device 25 delivers the sample word "11" associated with the symbol $S_k=3$; if the sample level lies between the upper threshold Ss and the center threshold Sc, the decision device 25 produces the symbol word "01" associated with the symbol $S_k=1$; if the sample level lies between the center threshold Sc and the lower threshold Si, the symbol word "10" is produced by the device 25; finally, for a symbol level below the threshold Si, the symbol word "00" associated with the symbol $S_k=-3$ is produced.

In the decision device 25 of a receive subsystem of the prior art the decision thresholds Ss, Sc and Si are constant and the level of the received signal S* is varied relative to the constant decision thresholds. This variation may be the result of a "displacement" and/or an "amplification" of the baseband signal S*.

Figure 5:
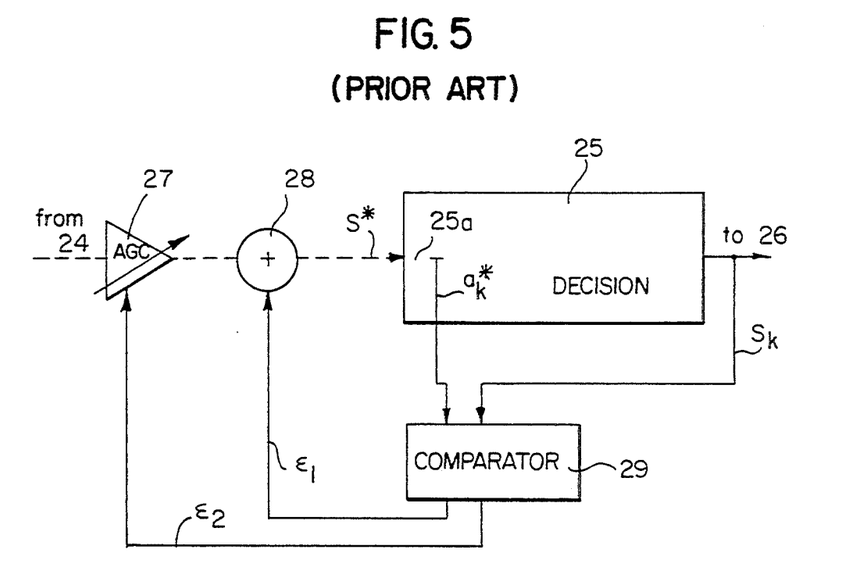
FIG. 5 is a block diagram of a decision device in which the baseband signal is controlled according to the prior art, included in a receive subsystem of the type shown in FIG. 2.

As shown in FIG. 5, the means used to vary the baseband signal S* are in the form of an amplifier 27 with automatic gain control (AGC) and an adder 28, both on the input side of the decision device 25 in the receive subsystem 2, and a comparator 29. Inputs of the comparator 29 respectively receive, at the symbol transmission frequency, the samples $a_k*$ resulting from the sampling 25a of the baseband signal S* and the corresponding symbols $S_k$ produced by the decision device 25. By comparing the signals $a_k*$ and $S_k$ the comparator produces two error signals $\epsilon 1$ and $\epsilon 2$ respectively applied to a control input of the amplifier 27 and to a second input of the adder 28. In response, the amplifier 27 amplifies the received signal S* and the adder 28 displaces the DC component in the received signal, and therefore in the baseband signal S* so that the level of each sample $a_k*$ is slaved to the level of the corresponding symbol $S_k$. The variation of the signal S* reduces the error rate in the received binary signal Sb at the output of the parallel-to-serial converter 26.

The displacement operation of the signal S* by the adder 28 can be regarded as a simultaneous displacement or translation of the three thresholds Ss, Sc and Si.

The amplification of the signal S* by the amplifier 27 can be regarded as two respective translations of equal magnitude and opposite sign of the thresholds Ss and Si relative to the threshold Sc.

Controlling the amplitude of the signal S* according to constant predetermined thresholds Ss, Sc and Si by means of an automatic gain control amplifier 27 produces a result that is satisfactory in terms of error rate reduction provided that the upper and lower eye patterns Os and Oi in the eye diagram have apertures d which are substantially equal and symmetrical about a horizontal axis corresponding to the threshold Sc in FIG. 3. In practice, although this condition is met by linear type modulation systems, such as amplitude modulation systems, it is not met by non-linear modulation systems, typically frequency modulation systems.

Figure 4:
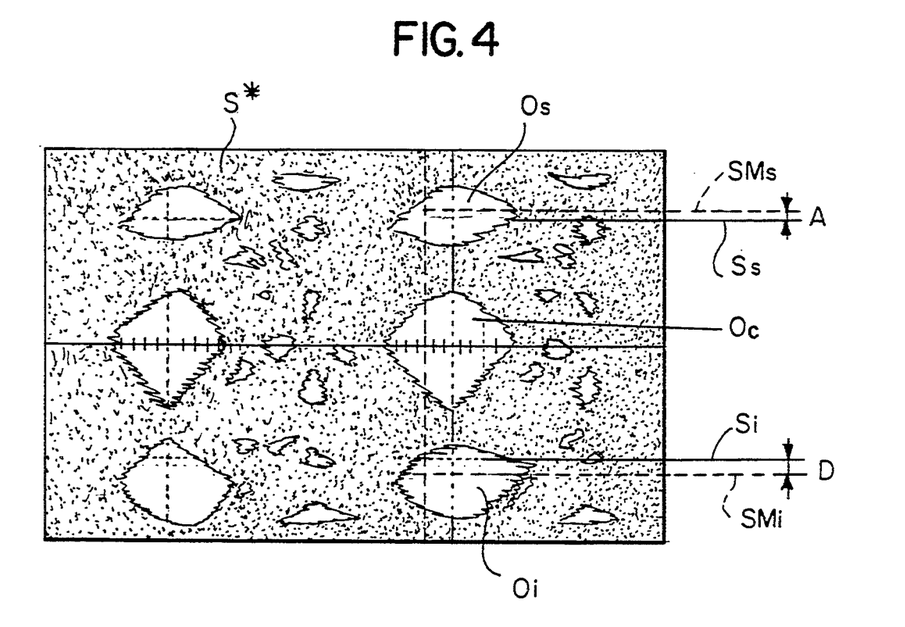
FIG. 4 is an eye diagram as observed in practice for the baseband signal distorted by successive filtering and resulting from demodulation of a four-state frequency modulated signal.

As shown in the eye diagram of FIG. 4 relating to four-state frequency modulation, the upper eye pattern Os and the lower eye pattern Oi do not have the above-stated symmetry and eye dimension characteristics. FIG. 4 also shows the theoretical optimal upper and lower thresholds Ss and Si for null intersymbol interference. It can be seen that reducing the error rate to a minimal value entails a negligible increase A of the upper threshold Ss to yield a modified upper threshold SMs and a more marked decrease D of the lower threshold Si to yield a modified lower threshold SMi. This modification of the thresholds Ss and Si to yield the thresholds SMs and SMi does not result from equal and opposite translations of the respective thresholds Ss and Si relative to the center threshold Sc, as is effected by an automatic gain control amplifier 27 in the prior art.

OBJECT OF THE INVENTION

The main object of this invention is to provide a decision device suitable for non-linear modulation systems in which a baseband signal resulting from modulation and demodulation has on average and at meaningful sampling times levels which are asymmetric relative to a null level axis. This signal characteristic is reflected in an asymmetric eye diagram. It results from asymmetric filtering in the transmit and receive subsystems of a frequency modulation type non-linear modulation system.

SUMMARY OF THE INVENTION

Accordingly, a decision device for producing at a symbol frequency symbols according to levels of a baseband signal resulting from demodulation of a multistate frequency modulated signal, comprises voltage divider means having first and second inputs to which are respectively applied lower and upper voltages delimiting a voltage range for establishing plural voltages in the voltage range, adding means for adding said baseband signal to a midpoint voltage which is substantially equal to the mean of the lower and upper voltages and established by the voltage divider means thereby producing a transposed signal, plural comparator means for comparing the transposed signal with the plural voltages respectively to produce comparison result signals, encoder means for deriving control words at the symbol frequency, each control word being dependent on comparison result signals which are representative of a level of the baseband signal relative to lower, midpoint and upper decision thresholds corresponding to three respective voltages of the plural voltages, and first and second control means for respectively and independently slaving the lower and upper voltages as a function of the control words.

The first and second control means correct the decisions at the level of the lower eye pattern Oi and the upper eye pattern Os. To this end, said first and second control means respectively comprise first and second logic means for deriving respective first and second three-state error signals, the first, respectively second error signal being at two predetermined states only in response to first, respectively second predetermined control words conditioned by first, respectively second two levels of the transposed signal situated on either side of the lower, respectively upper decision threshold, first and second integrators for integrating the first and second error signals thereby producing first and second integrated signals, and first and second adders for respectively adding the first integrated signal with a lower nominal voltage and the second integrated signal with an upper nominal voltage, in order to establish the lower and upper voltages.

The invention also attempts to remedy the asymmetry of the center eye pattern Oi in the eye diagram (FIG. 4). The decision device then comprises third control means for controlling, according to the control words and the midpoint voltage, said center decision threshold to be added in place of the midpoint voltage to said baseband signal in the adding means. The third control means can comprise, like the first and second control means, a third logic means for deriving a third error signal having at least two states, the third error signal being at two predetermined states in response to third two predetermined control words conditioned by third two levels of the transposed signal situated to either side of the midpoint voltage, i.e. either side of the center decision voltage, a third integrator for integrating said third error signal thereby producing a third integrated signal, and a third adder for adding said third integrated signal with the midpoint voltage in order to establish said center decision threshold.

The encoder means comprises plural means for sampling at the symbol frequency the comparison result signals thereby producing sampled comparison signals, and means for encoding the sampled comparison signals thereby deriving a rank word identifying the highest rank of comparator means having produced a comparison result signal with a predetermined logic level, at least three most significant bits of the rank words constituting the control words.

In one embodiment of the invention each of the sampling means is a D-type flip-flop.

The decision device further comprises a rhythm recovering circuit receiving one bit of the rank word in order to produce a sampling signal clocking sampling in said sampling means.

In practice, the voltage divider means, the comparator means and the encoder means are included in an analog-to-digital converter integrated circuit.

BRIEF DESCRIPTION OF THE DRAWINGS

The foregoing and other objects, features and advantages of the invention will be apparent from the following detailed description of several embodiments of the invention with reference to the corresponding accompanying drawings, the first five figures in which have already been explained, in which.

DETAILED DESCRIPTION OF THE PREFERRED EMBODIMENTS

Figure 6:
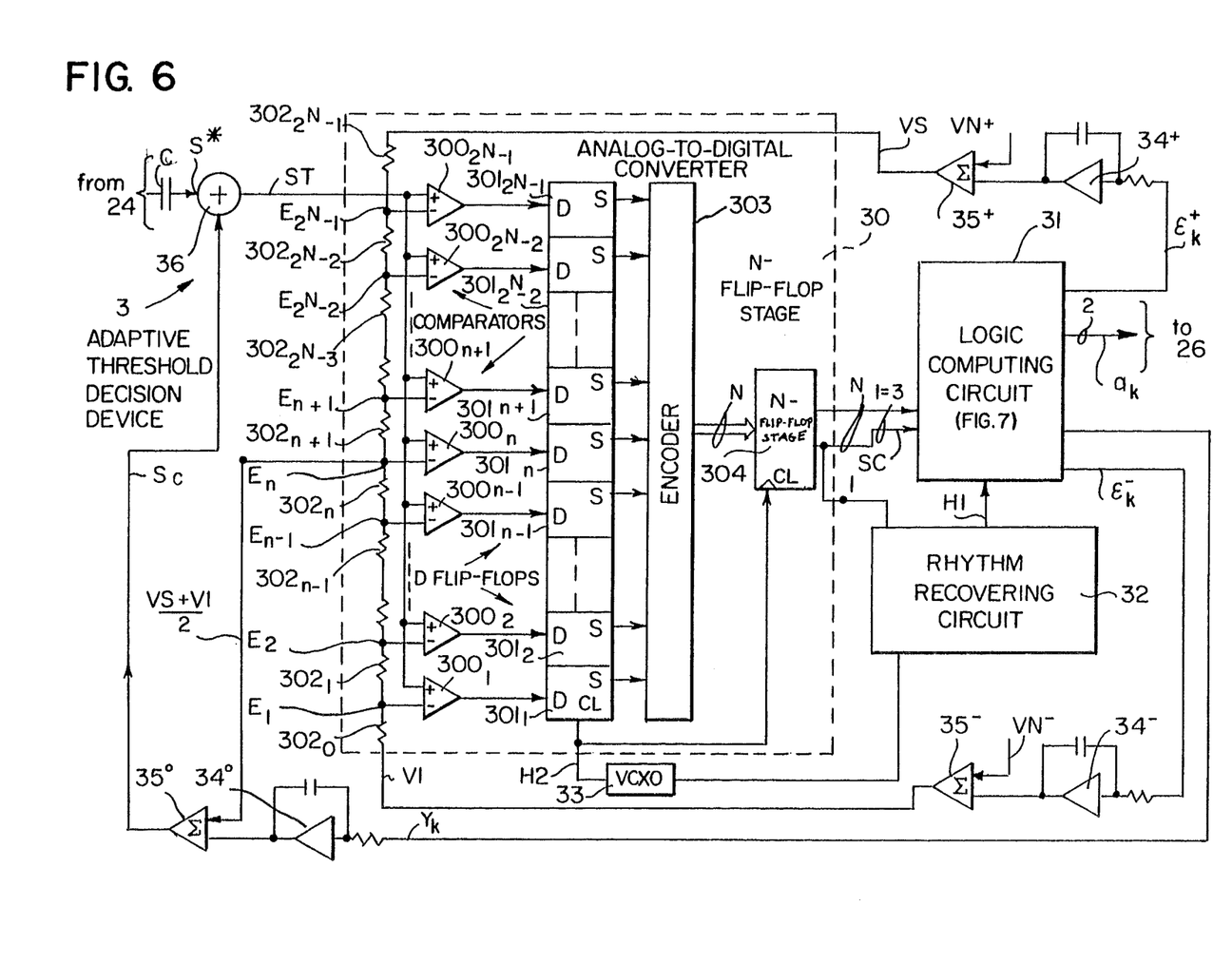
FIG. 6 is a detailed block diagram of an adaptive threshold decision device according to the invention.

Referring to FIG. 6, an adaptive threshold decision device 3 according to the invention comprises an analog-to-digital converter 30, a logic computing circuit 31, a rhythm recovering circuit 32, a voltage controlled oscillator 33, three integrators $34^-$, $34^0$ and $34^+$ and four adders $35^-$, $35^0$, $35^+$ and 36.

The N-bit analog-to-digital converter 30 with accuracy N comprises $2^N-1$ comparators $300_1$ through $300_{2^N-1}$, $2^N-1$ D-type flip-flops $301_1$ through $301_{2^N-1}$, a series of $2^N$ resistors $302_0$ through $302_{2^N-1}$, an encoder 303 and a stage 304 with N D-type flip-flops in parallel, N being a predetermined integer at least equal to 3.

A lower voltage VI and an upper voltage VS are respectively applied to two terminals of the series of $2^N$ resistors $302_0$ through $302_{2^N-1}$, which form a voltage divider stage. The two terminals are one terminal of the first resistor $302_0$ and one terminal of the last resistor $302_{2^N-1}$. The limit voltages VI and VS delimit a range of quantization of a received signal by the converter 30. $2^N-1$ terminals common to paired successive resistors ($302_{n-1}$, $302_n$), where n is between 1 and $2^N$, are at respective voltages $E_1$ through $E_{2^N-1}$ increasing in the quantization range (VS−VI). All the resistors $302_0$ through $302_{2^N-1}$ have the same resistance R. The voltage at the terminals of each of the resistors $302_0$ through $302_{2^N-1}$ is equal to $(VS-VI)/2^N$ and defines the quantization step, i.e., the accuracy of the converter 30.

Positive terminals (+) of the $2^N-1$ comparators $300_1$ through $300_{2^N-1}$ receive an analog signal ST transposed into the baseband by transposition in the adder 36 of the signal S* at the output of the filter 24 included in the receive subsystem 2 (FIG. 2). The adder 36 is preferably preceded by a capacitor C rejecting any DC component in the signal S*. The voltages $E_1$ through $E_{2^N-1}$ increasing in arithmetic progression produced at the common terminals of the series-connected resistors are applied to negative (−) terminals of the comparators $300_1$ through $300_{2^N-1}$. Each comparator $300_n$, n being between 1 and $2^N-1$, produces a logic signal representative at any time of the result of comparing the voltage $E_n$ with the transposed signal ST. Thus for a level of the transposed signal ST lying between the voltages $E_n$ and $E_{n+1}$, all the comparators $300_m$, where $m \leq n$, produce a signal at the "1" state and all the comparators $300_m$, where $m \geq n+1$, produce a signal at the "0" state.

The outputs of the comparators $300_1$ through $300_{2^N-1}$ are respectively connected to data inputs D of the $2^N-1$ D-type sampling flip-flops $301_1$ through $301_{2^N-1}$. A clock input CL of these $2^N-1$ flip-flops $301_1$ through $301_{2^N-1}$ receives a clock signal H2 produced by the voltage-controlled oscillator 33. The corresponding "1" and "0" states at the outputs of the comparators $300_1$ through $300_{2^N-1}$ are respectively stored at data outputs S of the $2^N$ D-type flip-flops in response to each active edge of the signal H2 and during a period of this clock signal H2. The outputs S of the $2^N$ D-type flip-flops are respectively connected to $2^N-1$ inputs of the encoder 303 which derives an N-bit flip-flop rank word corresponding to the highest rank of the D-type flip-flops whose outputs have produced a "1" state. In the previously mentioned example relating to a level of the transposed signal ST lying between the voltages $E_n$ and $E_{n+1}$, the rank word derived by the encoder 303 corresponds to the rank n in binary code of the flip-flop $301_n$. If the signal VT lies between the voltages VI and $E_1=VI+(VS-VI)/2^N$, the bits of the rank word are all equal to "0".

The N-bit rank word derived by the encoder is stored in the stage 304 by N flip-flops clocked by the clock signal H2. Only I=3 of the N parallel bits at the outputs of the stage 304 are applied to an input port of the computing logic circuit 31. These I=3 bits are the three most significant bits (MSB) $SC_{N-1}$, $SC_{N-2}$ and $SC_{N-3}$ of the N-bit rank word and form a word of control signal SC.

Note that one bit of the rank word at the output of the flip-flop stage 304, preferably the most significant bit (MSB), is applied to an input of the rhythm recovering circuit 32 which produces a clock signal H1 and controls the voltage-controlled oscillator 33 producing clock signal H2. The clock signal H2 is therefore slaved to the phase of the symbols received for sampling the comparison result signals in the D-type flip-flops $300_1-300_{2^N-1}$.

A table of control signals derived by the logic computing circuit 31 is described next with reference to FIG. 7. The logic computing circuit is clocked by the clock signal H1 which typically has a frequency equal to half the frequency of the clock signal H2. As shown in the three lefthand columns of the table, the I=3 most significant bits $SC_{N-1}$, $SC_{N-2}$ and $SC_{N-3}$ of the rank word forming the control signal SC are sufficient to describe each level of the transposed signal ST relative to, firstly, the theoretical levels of the symbols $S_k$ in the set {−3, −1, +1, +3} and, secondly, the decision thresholds Si, Sc and Ss. In the case of the embodiment described the lower and upper thresholds Si and Ss respectively correspond to a common terminal voltage Ei substantially equal to VI+(VS−VI)/4 and a common terminal voltage Es substantially equal to VS−(VS−VI)/4. The circuit 31 produces at the symbol transmission frequency H1, two-bit symbol words $a_k$, a three-state lower threshold adjustment error logic signal $\epsilon^-{}_k$, a three-state upper threshold adjustment error signal $\epsilon^+{}_k$, and a displacement error bipolar signal $\gamma_k$ for transposing the baseband signal S*. Each of the two-bit symbol words $a_k$ is produced by the circuit 31 as a function of the first two most significant bits (MSB) $SC_{N-1}$ and $SC_{N-2}$ of the I=3 bits of the control signal SC, these two bits representing the sampling level of the signal ST relative to the three thresholds Si, Sc and Ss.

The third error signal $\gamma_k$ assumes the state "+1" or "−1" according to the state "1" or "0" of the least significant bit (LSB) $SC_{N-3}$ of the control signal SC.

The second error signal $\epsilon^+{}_k$ systematically assumes a null value "0" except for sets of three bits $SC_{N-1}$, $SC_{N-2}$, $SC_{N-3}$ equal to "101" and "110" of the control signal SC for which it respectively assumes the states "−1" and "+1". These sets of three bits "101" and "110" correspond to levels of the signal ST near and on either side of the upper threshold Ss.

The first error signal $\epsilon^-{}_k$ systematically assumes a null value "0", except for sets of three bits $SC_{N-1}$, $SC_{N-2}$, $SC_{N-3}$ equal to "001" and "010" of the control signal SC for which it respectively assumes the states "−1" and "+1". These sets of three bits "001" and "010" correspond to levels of the signal ST near and on either side of the lower threshold Si.

The error signal $\gamma_k$ is integrated over a period significantly greater than the period of the clock signal H1 by the integrator $34^0$ to produce an integrated displacement error signal which is applied to a first input of the adder $35^0$. A second input of the adder $35^0$ is at a midpoint voltage (VS+VI)/2 at the terminal common to the resistors $302_{2N-1}$ and $302_{2N-1-1}$, which is substantially equal to $E_n$ in the embodiment shown in FIG. 6. The output of the adder $35^0$ is connected to a first input of the adder 36 a second input of which receives the baseband signal S*. The component $E_n$ added to the signal S* by the adder 36 transposes the baseband signal S* into a positive voltage range coinciding with the quantization range of the analog-to-digital converter 30, typically lying between 0 volts and 5 volts.

The first error signal $\epsilon^-{}_k$ is time integrated by the integrator $34^-$ analogous to the integrator $34^0$ to produce an integrated lower error signal which is applied to a first input of the adder $35^-$. A second input of the adder $35^-$ is at a lower nominal voltage $VN^-$. The adder $35^-$ produces the lower voltage VI which is applied to the terminal of the first resistor $302_0$.

The second error signal $\epsilon^+{}_k$ is time integrated by the integrator $34^+$ analogous to the integrator $34^0$ to produce an integrated upper error signal which is applied to a first input of the adder $35^+$. A second input of the adder $35^+$ is at an upper nominal voltage $VN^+$. The adder $35^+$ produces the upper voltage VS applied to the terminal of the last resistor $302_{2N-1}$.

The operation of the adaptive threshold decision device 3 and the functions of the three voltage control loops are now described in detail with reference to FIGS. 6 and 7. The first voltage control loop comprises the integrator $34^0$, the adder $35^0$ and the adder 36. The second voltage control loop comprises the integrator $34^-$ and the adder $35^-$. The third voltage control loop comprises the integrator $34^+$ and the adder $35^+$.

Figure 7:
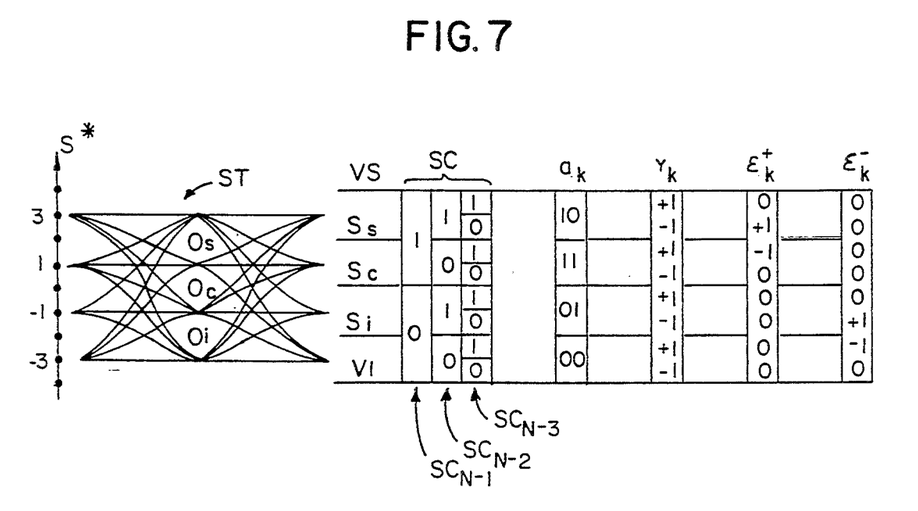
FIG. 7 is a table of control signals associated with a theoretical eye diagram analogous to that in FIG. 3 and produced by a logic circuit included in the decision device shown in FIG. 6.

Referring to FIG. 7, the lower error signal $\epsilon^-{}_k$ goes from the "−1" state to the "+1" state when the control signal SC changes from "001" to "010", and vice versa These values correspond to two quantization levels of the baseband signal ST in the flip-flops $301_1$ through $302_{2N-1}$ respectively below and above the lower threshold Si. By virtue of the integration of the error signal $\epsilon^-{}_k$ the lower limit voltage VI is slaved to the binary configurations "001" and "010" in the control signal SC and thus to the distortion of the baseband signal S* in the lower part Oi of the eye diagram. On average, if the error signal $\epsilon^-{}_k$ remains in the "−1" state, this indicates that the threshold Si is too high. In this case the lower limit voltage VI is reduced to a value substantially less than the lower nominal value $VN^-$, which also reduces the lower threshold Si≅[-VI+(VS−VI/4]. On the other hand, if the error signal $\epsilon^-{}_k$ remains in the "+1" state, the voltage VI is increased to a value substantially greater than $VN^-$, which increases the lower threshold Si.

The above remarks apply by analogy to the control of the upper limit voltage VS and the threshold Ss≅VS−(VS−VI)/4 according to the "101" and "110" configurations of the control signal SC by means of the error signal $\epsilon^+{}_k$ in the control loop comprising the components $34^-$ and $35^-$ and thus according to the distortion of the baseband signal S* in the upper part Os of the eye diagram.

In a variant offering lower performance, in the absence of the center threshold Sc control loop, i.e. of the integrator $34^0$ and the adder $35^0$, the midpoint of the series of resistors $302_0$ through $302_{2N-1}$ is connected directly to the first input of the adder 36. The midpoint voltage (VS−VI)/2 then varies with the average of the controlled limit voltages VI and VS so that the converter 30 operates linearly in its positive quantization range.

However, referring to FIG. 6, the integrator $34^0$ and the adder $35^0$ contribute to controlling the center threshold Sc according to central distortions in the baseband signal S* and in particular for the eye pattern Oc. In this way, if after integration, the third error signal $\gamma_k$ tends towards "−1", respectively towards "+1", this indicates that the threshold Sc, i.e. the voltage "$E_n$" at the midpoint of the series of resistors, is too high, respectively too low, and that it must be reduced, respectively increased.

The center threshold Sc therefore tracks the variations in the limit voltages VI and VS while being controlled according to the distortions of the "−1" and "1" symbols of the received 4FSK signal.

In an alternative embodiment the third error signal $\gamma_k$ is a three-level signal which is in the "0" state except for the "011" and "100" combinations of the control signal SC for which it respectively assumes the "−1" and "+1" states.

Compared to the prior art, the adaptive threshold decision device 3 according to the invention does not effect global transposition of the baseband signal by means of an automatic gain control amplifier. In other words, the device 3 does not multiply simultaneously by the same voltage gain the thresholds Si, Sc and Ss. Rather, it adjusts each of these three thresholds independently to provide the best match to the asymmetric nature of the eye diagram and therefore to the levels assumed by the baseband signal S* at successive sampling times according to the symbols received.

What is claimed is:

1. A decision device for producing at a symbol frequency symbols according to levels of a baseband signal resulting from demodulation of a multistate frequency modulated signal, comprising voltage divider means having first and second inputs to which are respectively applied lower and upper voltages delimiting a voltage range for establishing plural voltages in said voltage range, adding means for adding said baseband signal to a midpoint voltage which is substantially equal to a mean of said lower and upper voltages and established by said voltage divider means thereby producing a transposed signal, plural comparator means for comparing said transposed signal with said plural voltages respectively thereby producing comparison result signals, encoder means for deriving control words at said symbol frequency, each control word being dependent on comparison result signals which are representative of a level of said baseband signal relative to lower, midpoint and upper decision thresholds corresponding to three respective voltages of said plural voltages, and first and second control means for respectively and independently slaving said lower and upper voltages as a function of said control words.

2. The device claimed in claim 1, wherein said first and second control means, respectively, comprise first logic means and second logic means for deriving a first three-state error signal and a second three-state error signal, respectively, said first error signal being at two predetermined states only in response to first two predetermined control words conditioned by first two levels of said transposed signal situated on either side of said lower decision threshold, respectively, said second error signal being at said two predetermined states only in response to second two predetermined control words conditioned by second two levels of said transposed signal situated on either side of said upper decision threshold, respectively, first and second integrators for integrating said first and second error signals, thereby producing a first integrated signal and a second integrated signal, and first and second adders for adding said first integrated signal with a lower nominal voltage and said second integrated signal with an upper nominal voltage, respectively, in order to establish said lower voltage and said upper voltage.

3. The device claimed in claim 1 wherein said encoder means comprises plural means for sampling at said symbol frequency said comparison result signals thereby producing sampled comparison signals, and means for encoding said sampled comparison signals thereby deriving a rank word identifying a highest rank of comparator means having produced a comparison result signal with a predetermined logic level, at least most significant three bits of said rank word constituting one of said control words.

4. The device claimed in claim 3 comprising a rhythm recovering circuit receiving one bit of said rank word in order to produce a sampling signal clocking sampling in said plural means for sampling.

5. The device claimed in claim 1 on the output side of a frequency demodulation discriminator in a receive subsystem of a four-state frequency modulation-demodulation system.

6. A decision device for producing at a symbol frequency symbols according to levels of a baseband signal resulting from demodulation of a multistate frequency modulated signal, comprising voltage divider means having first and second inputs to which are respectively applied lower voltage and upper voltage delimiting a voltage range for establishing plural voltages in said voltage range, adding means for adding said baseband signal to a center decision threshold which depends on a midpoint voltage which is substantially equal to a mean of said lower voltage and upper voltage thereby producing a transposed signal, plural comparator means for comparing said transposed signal with said plural voltages respectively thereby producing comparison result signals, encoder means for deriving control words at said symbol frequency, each control word being dependent on comparison result signals which are representative of a level of said baseband signal relative to lower decision threshold and upper decision threshold corresponding to two respective voltages of said plural voltages and relative to said center decision threshold, first control means and second control means for respectively and independently slaving said lower voltage and upper voltage as a function of said control words, and third control means having an input connected to an output of said voltage divider means at said midpoint voltage and an output connected to an input of said adding means for slaving said center decision threshold as a function of said control words.

7. The device claimed in claim 6 wherein said first control means comprises a first logic means for deriving a first three-state error signal, said first error signal being at two predetermined states only in response respectively to first two predetermined control words conditioned by first two levels of said transposed signal situated on either side of said lower decision threshold, a first integrator for integrating said first error signal thereby producing a first integrated signal, and a first adder for adding said first integrated signal with a lower nominal voltage in order to establish said lower voltage, said second control means comprises a second logic means for deriving a second three-state error signal, said second error signal being at two predetermined states only in response respectively to second two predetermined control words conditioned by second two levels of said transposed signal situated on either side of said upper decision threshold, a second integrator for integrating said second error signal thereby producing a second integrated signal, and a second adder for adding said second integrated signal with a lower nominal voltage in order to establish said upper voltage, and said third control means comprises a third logic means for deriving a third error signal having at least two states, said third error signal being at two predetermined states in response respectively to third two predetermined control words conditioned by third two levels of said transposed signal situated to either side of said midpoint voltage, a third integrator for integrating said third error signal thereby producing a third integrated signal, and a third adder for adding said third integrated signal with said midpoint voltage in order to establish said center decision threshold.

8. The device claimed in claim 6 wherein said encoder means comprises plural means for sampling at said symbol frequency said comparison result signals thereby producing sampled comparison signals, and means for encoding said sampled comparison signals thereby deriving a rank word identifying the highest rank of comparator means having produced a comparison result signal with a predetermined logic level, at least three most significant bits of said rank word constituting one of said control words.

9. The device claimed in claim 8 comprising a rhythm recovering circuit receiving one bit of said rank word in order to produce a sampling signal clocking sampling in said plural means for sampling.

10. The device claimed in claim 6 on the output side of a frequency demodulation discriminator in a receive subsystem of a four-state frequency modulation-demodulation system.

* * * * *